United States Patent [19]
Lockshaw et al.

[11] Patent Number: 5,616,376
[45] Date of Patent: *Apr. 1, 1997

[54] RETICULATED STRUCTURAL ELEMENT

[76] Inventors: James J. Lockshaw; Stephen Kelly; Randall Walker; John Kaiser, Jr., all of 18341 Jamboree Rd., Irvine, Calif. 92715-1073

[*] Notice: The term of this patent shall not extend beyond the expiration date of Pat. No. 5,273,806.

[21] Appl. No.: 440,623

[22] Filed: May 15, 1995

Related U.S. Application Data

[63] Continuation-in-part of Ser. No. 173,611, Dec. 27, 1993, Pat. No. 5,487,930, which is a continuation-in-part of Ser. No. 771,009, Oct. 3, 1991, Pat. No. 5,273,806, and Ser. No. 332,516, Oct. 31, 1994.

[51] Int. Cl.[6] .................................................. B32B 3/00
[52] U.S. Cl. .................. 428/33; 428/53; 428/119; 428/120; 428/133; 428/137; 428/172; 428/188; 52/783.1; 52/793.11

[58] Field of Search ..................... 428/147, 120, 428/99, 101, 53, 33, 133, 178, 166, 119, 156, 142, 188, 131, 137; 52/793.11, 783.1

[56] References Cited

U.S. PATENT DOCUMENTS

| | | | |
|---|---|---|---|
| 4,304,821 | 12/1981 | Hayase et al. | 428/593 |
| 4,957,788 | 9/1990 | Colonel | 428/33 |
| 5,273,806 | 12/1993 | Lockshaw et al. | 428/167 |
| 5,487,930 | 1/1996 | Lockshaw et al. | 428/167 |

*Primary Examiner*—Donald Loney
*Attorney, Agent, or Firm*—Louis J. Bachand

[57] ABSTRACT

Structural elements such as baffles are formed from spaced, laterally disposed, longitudinally extended structures having longitudinally distributed ribbing, and rib segments fixed to the structure ribbing normal to the structure to form closed figures in a laterally and longitudinally extended pattern.

21 Claims, 2 Drawing Sheets

RETICULATED STRUCTURAL ELEMENT

REFERENCE TO RELATED APPLICATIONS

This application is a continuation in part of application Ser. No. 08/173,611, filed Dec. 27, 1993, now U.S. Pat. No. 5,487,930 a which is a continuation in pan of application Ser. No. 07/771,009, filed Oct, 3, 1991 now U.S. Pat. No. 5,273,806, and is further a continuation in part of copending application Ser. No. 08/332,516 filed Oct. 31, 1994 allowed Mar. 22, 1966. The disclosures of each of the foregoing applications are hereby incorporated by reference.

TECHNICAL FIELD

This application relates to structural elements, such as aircraft, boat and vehicle components, e.g. turbine reverse thrust baffles, which are reticulated, lightweight, extremely strong, widely variable in size, configuration and material of construction, easy to manufacture with widely available equipment, and free of the problems associated with other forms of structural elements serving some of the same purposes. In the case of such baffles high strength and low weight are important characteristics as is low cost manufacture.

BACKGROUND OF THE INVENTION

In U.S. Pat. No. 5,273,806, structural elements are disclosed which comprises surface structures and ribbing by which the surface structures are joined. In one the, the surface structures define registerable patterns of ribbing which are joined to space the surface structures and complete the structural element.

SUMMARY OF THE INVENTION

There is a need for structural elements which are reticulated and free of surface structures. Such structural elements desirably have high strength and light weight and are readily shaped to fit a wide spectrum of applications.

It is an object, therefore, to provide improvements in the design of structural elements. It is another object to provide structural element designs which are reticulated and free of one or both surface structures.

These and other objects of the invention to become apparent hereinafter are realized in a structural element comprising a series of generally planar, longitudinally extended structures laterally disposed relative to each other at a predetermined spacing, the structures defining longitudinally distributed series of opposed pairs of transverse ribbing, longitudinally distributed series of generally planar, laterally disposed rib segments joining the structures across the predetermined spacing at the ribbing pairs in laterally and longitudinally extended, closed figure pattern defining relation.

In this and like embodiments, the structures are parallel, and/or the rib segments are parallel, the ribbing forms slots sized to receive the rib segments, the closed figure pattern comprises a laterally and longitudinally extended series of generally rectangular figures, the structures and rib segments comprise metal, the element includes end-structures having ribbing on their inward face toward the rib segments, the element end structures have fastening means on their outward face away from the ribbing segments, the structures are arcuate in a plane normal to the rib segments, and/or the rib segments are arcuate.

In a further embodiment the invention provides a structural element comprising a series of longitudinally extended structures laterally disposed relative to each other at a predetermined spacing, the structures defining longitudinally distributed series of opposed pairs of transverse ribbing, longitudinally distributed series of laterally disposed rib segments joining the structures across the predetermined spacing at the ribbing pairs in laterally and longitudinally extended, closed figure pattern defining relation, the structures and rib segments comprising fiber reinforced resin.

In this and like embodiments the ribbing forms slots sized to receive the rib segments, the closed figure pattern comprises a laterally and longitudinally extended series of generally rectangular figures, the element includes end-structures having ribbing on their inward face toward the rib segments, the element end structures have fastening means on their outward face away from the ribbing segments, the structures are arcuate, the rib segments are arcuate, the ribbing is integral with the structures, and the rib segments are adhesively bonded in the structure ribbing slots.

In a particularly preferred embodiment, the invention provides a structural element comprising a series of longitudinally extended, narrow, generally planar, parallel structures laterally disposed relative to each other at a predetermined spacing, the structures each being arcuate within a plane and defining a longitudinal succession of transverse ribbings, a longitudinal succession of laterally disposed, parallel, rib segments joining the structures across the predetermined spacing, the rib segments being arcuate within a plane normal to the structure planes, each the rib segment being fixed between opposed pairs of the ribbing in laterally and longitudinally extended, closed figure pattern defining relation, the ribbing being spaced such that the rib segments and the portion of the structure between successive ribbings fixed to the rib segments generally define a rectangle, end-structures on the element having ribbing on their inward face toward the rib segments and fastening means on their outward face away from the ribbing segments, the structures and ribbing being integrally formed of fiber reinforced resin, the rib segments being adhesively bonded in the structure ribbing slots.

BRIEF DESCRIPTION OF THE DRAWINGS

The invention will be further described in conjunction with the attached drawings in which.

DESCRIPTION OF THE PREFERRED EMBODIMENTS

The term a "closed figure pattern of ribbing" herein refers to a series of laterally or longitudinally adjacent closed figures of rib segments and structures forming a closed pattern. A "closed figure" is one in which all sides of the figure intersect another side, and one in which a straight line drawn anywhere through the figure will intersect sides in at least two places, including a circle, triangle and rectangle in which adjacent segments of ribbing are contiguous, as well as circular and rectangular spirals and other figures wherein although rib segments and structures are arranged about a common point and adjacent segments and structures are not always contiguous, a straight line drawn anywhere through the figure will intersect the figure sides in at least two places.

Figure 3:
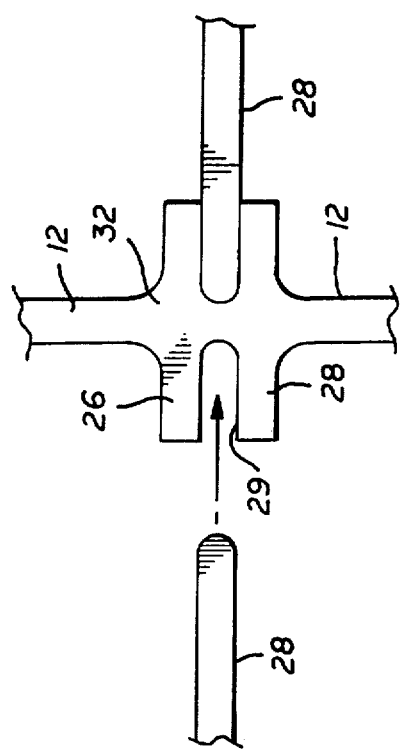
Figure 2:
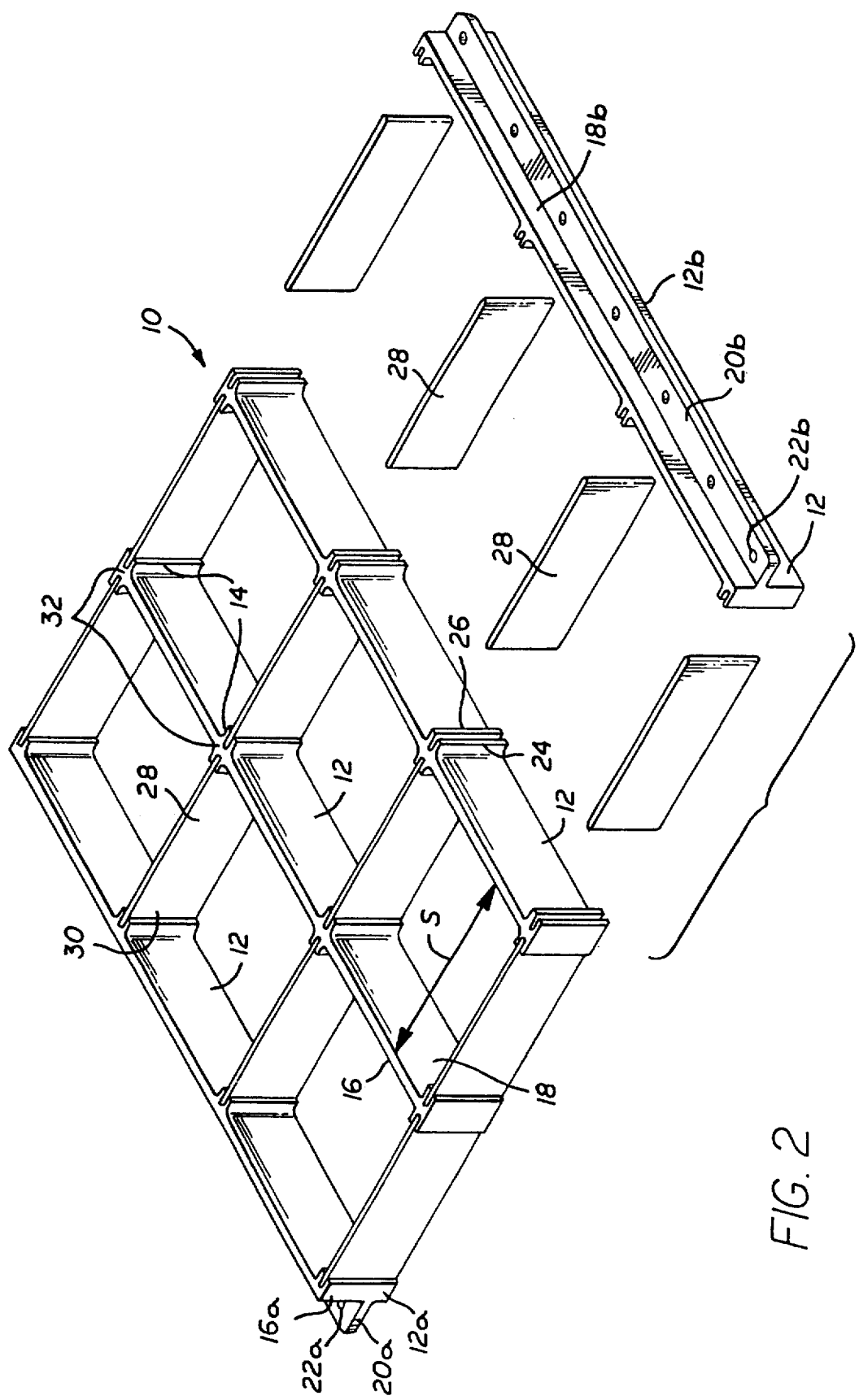
FIG. 2 is an axonometric view of the invention structural element in a different form; and, FIG. 3 is a plan view of the ribbing slot and interfitted rib segment.

With reference to the drawings, in FIGS. 2 and 3 a structural element 10 is shown comprising a series of generally planar, longitudinally extended structures 12 laterally disposed relative to each other at a predetermined spacing S. Ribbing 14 rises from the front and rear surfaces 16, 18 of the structures 12 except at the ends of the structural element 10. The final structures 12a, 12b have no ribbing on their outer surfaces 16a, 18b but rather flanges 20a, 20b apertured at 22a, 22b for receiving fasteners (not shown). Ribbing 14 in the embodiment shown comprises leer and fight ribbing portions 24, 26 in parallel and closely spaced so as to closely receive and support rib segments 28 in slots 29 as will be described. The ribbings 14 are transverse to the longitudinal axis of the structures 12 and symmetrically distributed along the length of the structures with ribbings on opposing structures directly opposite each other, thus to receive between them rib segments 28 normal to or at right angles to the structures where a generally rectangular closed FIG. 30 is desired and repeatedly in the lateral and longitudinal direction to form overall a closed figure pattern as shown. Other figure shapes and other patterns of such shapes can be used for particular purposes. The ribbings 14 form junctions for the rib segments 28 at nodes 32 along the structures 12.

A longitudinally distributed series of rib segments 28 are arranged in a grid with the structures 12, the ends of the rib segments 28 being inserted and fixed in place with adhesive or by welding or other means so as to join the spaced structures 12. See FIG. 3.

Figure 1:
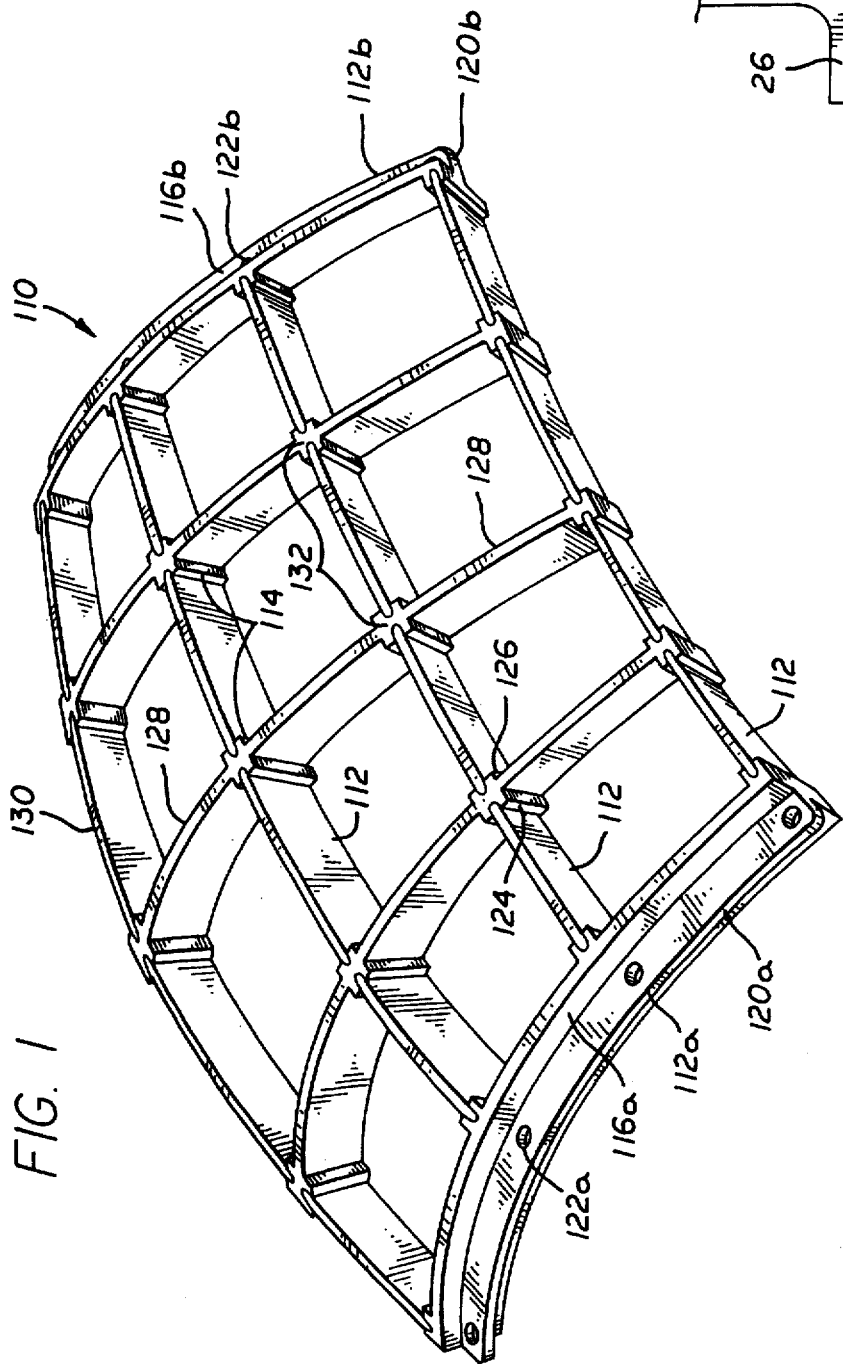
FIG. 1 is a perspective view of the invention structural element.

In FIG. 1, in which like parts to FIGS. 2 and 3 are given like numbers plus 100, a modified form of structural element 110 is shown with its structures 112 and rib segments 128 each arcuate in configuration as might be desirable in a jet engine thrust reverser element where the rib segments 28 would be given more or less curvature so as to deflect gases forward circumferentially about a turbine engine.

Useful materials for fabrication of the invention structural elements can be metals, particularly aluminum and titanium or other metals, composites of fibers, such as carbon, metal and glass fibers, and resins such as epoxy, urethane and engineering thermoplastics, and other materials of suitable strength, machinability, or fabricability. Fabrication may be by machining or in the case of fiber reinforced structural elements by winding and other resin structure forming processes.

The invention thus provides improvements in the design of structural elements and particularly provides structural elements which are reticulated and free of surface covers so as to be useful as baffles in guiding gas flows. The foregoing objects are thus met.

We claim:

1. Structural element comprising a series of generally planar, longitudinally extended structures laterally disposed relative to each other at a predetermined spacing, said structures defining longitudinally distributed series of opposed pairs of transverse ribbing, longitudinally distributed series of generally planar, laterally disposed rib segments joining said structures across said predetermined spacing at said ribbing pairs in laterally and longitudinally extended, closed figure pattern defining relation.

2. Structural element according to claim 1, in which said structures are parallel.

3. Structural element according to claim 1, in which said rib segments are parallel.

4. Structural element according to claim 1, in which said ribbing forms slots sized to receive said rib segments.

5. Structural element according to claim 1, in which said closed figure pattern comprises a laterally and longitudinally extended series of generally rectangular figures.

6. Structural element according to claim 1, in which said structures and rib segments comprise metal.

7. Structural element according to claim 1, in which said element includes end-structures having ribbing on their inward face only toward said rib segments.

8. Structural element according to claim 7, in which said element end structures have fastening means on their outward face only away from said ribbing segments.

9. Structural element according to claim 1, in which said structures are arcuate.

10. Structural element according to claim 1, in which said rib segments are arcuate.

11. Structural element according to claim 10, in which said structures are arcuate in a plane normal to said rib segments.

12. Structural element comprising a series of longitudinally extended structures laterally disposed relative to each other at a predetermined spacing, said structures defining longitudinally distributed series of opposed pairs of transverse ribbing, longitudinally distributed series of laterally disposed rib segments joining said structures across said predetermined spacing at said ribbing pairs in laterally and longitudinally extended, closed figure pattern defining relation, said structures and rib segments comprising fiber reinforced resin.

13. Structural element according to claim 12, in which said ribbing forms slots sized to receive said rib segments.

14. Structural element according to claim 13, in which said closed figure pattern comprises a laterally and longitudinally extended series of generally rectangular figures.

15. Structural element according to claim 14, in which said element includes end-structures having ribbing on their inward face toward said rib segments.

16. Structural element according to claim 15, in which said element end structures have fastening means on their outward face away from said ribbing segments.

17. Structural element according to claim 16, in which said structures are arcuate.

18. Structural element according to claim 17, in which said rib segments are arcuate.

19. Structural element according to claim 18, in which said fibbing is integral with said structures.

20. Structural element according to claim 19, in which said rib segments are adhesively bonded in said structure ribbing slots.

21. Structural element comprising a series of longitudinally extended, narrow, generally planar, parallel structures laterally disposed relative to each other at a predetermined spacing, said structures each being arcuate within a plane and defining a longitudinal succession of transverse ribbings, a longitudinal succession of laterally disposed, parallel, rib segments joining said structures across said predetermined spacing, said rib segments being arcuate within a plane normal to said structure planes, each said rib segment being fixed between opposed pairs of said ribbing in laterally and longitudinally extended, closed figure pattern defining relation, said ribbing being spaced such that said rib segments and the portion of said structure between successive ribbings fixed to said rib segments generally define a rectangle, end-structures on said element having fibbing on their inward face toward said rib segments and fastening means on their outward face away from said fibbing segments, said structures and ribbing being integrally formed of fiber reinforced resin, said rib segments being adhesively bonded in said structure ribbing slots.

\* \* \* \* \*

UNITED STATES PATENT AND TRADEMARK OFFICE
CERTIFICATE OF CORRECTION

PATENT NO. : 5,616,376
DATED : Apr. 1, 1997
INVENTOR(S) : Lockshaw et al.

It is certified that error appears in the above-indentified patent and that said Letters Patent is hereby corrected as shown below:

Column 1, line 6, delete "a" (first occurrence);

line 6, delete "pan" and insert therefor --part--;

line 28, delete "the" (second occurrence) and insert therefor --form--;

Column 3, line 6, delete "leer" and insert therefor --left--;

line 7, delete "fight" and insert therefor --right--;

line 15, delete "FIG. 30" and insert therefor --figure 30--;

Column 4, line 39, (claim 19) delete "fibbing" and insert therefor --ribbing--;

line 56, (claim 21) delete "fibbing" and insert therefor --ribbing--;

line 58, (claim 21) delete "fibbing" and insert therefor --ribbing--.

Signed and Sealed this

Eighth Day of July, 1997

*Attest:*

BRUCE LEHMAN

*Attesting Officer*  *Commissioner of Patents and Trademarks*